US011688125B2

(12) United States Patent
Wahrenberg

(10) Patent No.: US 11,688,125 B2
(45) Date of Patent: Jun. 27, 2023

(54) IMAGE PROCESSING APPARATUS AND METHOD TO PERFORM A RAY CASTING ALGORITHM TO GENERATE A RENDERED IMAGE FROM A VOLUMETRIC DATA SET

(71) Applicant: CANON MEDICAL SYSTEMS CORPORATION, Otawara (JP)

(72) Inventor: Magnus Wahrenberg, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 43 days.

(21) Appl. No.: 17/196,456

(22) Filed: Mar. 9, 2021

(65) Prior Publication Data

US 2022/0292757 A1 Sep. 15, 2022

(51) Int. Cl.
*G06T 15/06* (2011.01)
*G06T 15/08* (2011.01)
*G06T 7/00* (2017.01)

(52) U.S. Cl.
CPC ............ *G06T 15/06* (2013.01); *G06T 7/0012* (2013.01); *G06T 15/08* (2013.01); *G06T 2207/10081* (2013.01); *G06T 2207/10104* (2013.01); *G06T 2207/10116* (2013.01); *G06T 2207/10132* (2013.01)

(58) Field of Classification Search
CPC ....... G06T 15/06; G06T 7/0012; G06T 15/08; G06T 2207/10081; G06T 2207/10104; G06T 2207/10116; G06T 2207/10132; G06T 2210/41
See application file for complete search history.

(56) References Cited

U.S. PATENT DOCUMENTS

| 7,155,042 | B1* | 12/2006 | Cowan | G06T 7/66 |
| | | | | 382/128 |
| 9,384,548 | B1 | 7/2016 | Wahrenberg | |
| 10,008,026 | B2 | 6/2018 | Murray et al. | |
| 2015/0030219 | A1* | 1/2015 | Madabhushi | G06T 7/149 |
| | | | | 382/128 |
| 2018/0068590 | A1* | 3/2018 | Mattausch | G06F 17/10 |
| 2019/0094981 | A1* | 3/2019 | Bradski | G06F 3/017 |

(Continued)

OTHER PUBLICATIONS

Hauser et al., "Two-level Volume Rendering—fusing MIP and DVR", https://www.cg.tuwien.ac.at/research/publications/2005/eg-tut2005-iv/presentations/2LevelVR.pdf, 2005, 19 pages.

(Continued)

*Primary Examiner* — Maurice L. McDowell, Jr.
(74) *Attorney, Agent, or Firm* — Oblon, McClelland, Maier & Neustadt, L.L.P.

(57) ABSTRACT

A medical imaging apparatus includes processing circuitry configured to acquire a volumetric data set, acquire location information for a layer that is part of a structure represented in the volumetric data set, and perform a ray casting algorithm to generate a rendered image from the volumetric data set. The ray casting algorithm includes, for each of a plurality of rays cast through a volume of the volume of the volumetric data set: determining data values for a plurality of sample positions along the ray; estimating, based on the location information, a position of an intersection point at which the ray intersects the layer; and using a precomputed function to determine a contribution of the intersection point to an aggregated color for the ray.

18 Claims, 8 Drawing Sheets

(56) References Cited

U.S. PATENT DOCUMENTS

| | | | | |
|---|---|---|---|---|
| 2019/0147639 A1* | 5/2019 | Sudarsky | ............. | A61B 5/1073 |
| | | | | 345/424 |
| 2019/0272027 A1* | 9/2019 | Loftier | .................... | G06T 15/06 |
| 2019/0274641 A1* | 9/2019 | Joskowicz | ............ | G06T 11/006 |
| 2020/0064470 A1* | 2/2020 | Qin | ...................... | A61B 8/0866 |
| 2021/0279942 A1* | 9/2021 | Petkov | ...................... | G06T 7/50 |
| 2021/0335031 A1* | 10/2021 | Hamilton | ................ | G06T 15/06 |
| 2021/0390757 A1* | 12/2021 | Muthler | ................ | G06T 15/005 |

OTHER PUBLICATIONS

Kye et al., "Interactive Classification for Pre-Integrated Volume Rendering of High-Precision Volume Data", Graphical Models 70, 2008, 8 Pages.

\* cited by examiner

IMAGE PROCESSING APPARATUS AND METHOD TO PERFORM A RAY CASTING ALGORITHM TO GENERATE A RENDERED IMAGE FROM A VOLUMETRIC DATA SET

CROSS-REFERENCE TO RELATED APPLICATION

The present application is a national stage application of PCT Application No: PCT/EP2018/078723, filed Oct. 19, 2018, which claims priority to European Patent Application No. 17306462.7, filed on Oct. 24, 2017. The benefit of priority is claimed to each of the foregoing, and the entire contents of each of the foregoing are incorporated herein by reference.

FIELD

Embodiments described herein relate generally to an apparatus and method for image processing, for example an apparatus and method for rendering medical imaging data.

BACKGROUND

Volumetric medical imaging techniques that can produce three-dimensional medical imaging data using any of a variety of imaging modalities, for example CT, PET, MRI, ultrasound, and X-ray, are widely used for imaging or diagnostic purposes.

Volumetric medical image data may comprise a three-dimensional array of voxels, each voxel representative of a particular position in three-dimensional space and each voxel having one or more data values. For example in the case of CT data, each voxel may have an associated intensity value that is representative of the attenuation of the applied X-ray radiation provided at the location represented by the voxel. The intensity value may be referred to as an image value, gray value, gray level, voxel value or CT value. The intensity value may be measured in Hounsfield units (HU).

A wide variety of rendering techniques are known that are used to process volumetric image data in order to display a desired representation of a patient or other subject. For example, the volumetric image data may be rendered to display a two-dimensional projection of the three dimensional volumetric data. The two-dimensional projection may include desired texture or shading effects, and may provide an impression of a surface in three dimensions to the viewer.

Commonly used volume rendering techniques use a transfer function to map each of a series of sampled voxel values to an opacity value and a color value (usually represented by a combination of red, green and blue color values). In ray casting and similar techniques, for each pixel in a 2D projection an imaginary ray is cast from the perspective of the viewer through a corresponding point on a two-dimensional imaginary image plane and through a volume represented by a volumetric image data set.

Many volume rendered views rely on showing anatomy as a thin layer having high transparency. The surface of an anatomical structure, for example a surface of an organ, may be shown as a thin layer with high transparency. By representing the surface of the anatomical structure as a thin layer with high transparency, a user viewing the image may be able to see the boundaries of the anatomical structure, while also seeing the interior of a volume of the structure.

A thin layer to be rendered may also be referred to as a hull or a shell.

Views in which an anatomical structure is shown as a thin layer with high transparency may be called, for example, glass views.

Anatomical structures that may often be rendered as a thin layer may include, for example, the lungs, the heart, the head and the breast. For example, a glass lung view may be used in global illumination. In MR breast imaging, a mammography image may be shown in which a thin skin boundary is present.

Two-level rendering may be used. In two-level rendering, an image rendered using a first rendering modality, for example Shaded Volume Rendering, is fused with an image of the same anatomy that is rendered using a second rendering modality, for example Maximum Intensity Projection. A multi-object opacity view may be used, where multi-object opacity is a subset of two-level rendering.

A thin layer having high transparency may be used in rendering of the fetus, particularly when ultrasound imaging is performed in the first trimester or the first half of the second trimester. A glass view of the fetus may be used to see the internal organs of the fetus.

A thin layer having high transparency may traditionally be implemented by inserting a transfer function that may be referred to as a spike transfer function. An example of a spike transfer function is illustrated in FIG. 2 and described below. The spike transfer function targets a partial volume boundary between tissue intensities.

FIG. 1 shows a simplified example of a volume having a spatial variation in intensity values. Horizontal and vertical axes in FIG. 1 represent spatial axes. A circular region of higher intensity is positioned at the center of the volume of FIG. 1, and has an intensity that decreases with radius.

FIG. 2 shows an example of a spike transfer function 2, which is a spike transfer function in opacity only. A horizontal axis 4 of FIG. 2 shows intensity values on a scale from 0 to 1. A vertical axis 6 of FIG. 2 shows opacity values from 0 to 1. The spike transfer function 2 comprises a narrow spike in opacity at a particular intensity value, which in the example shown is around 0.38. Within the narrow spike, opacity values are high. Outside the narrow spike, opacity values are zero.

FIG. 3 shows a result of applying the spike transfer function 2 of FIG. 2 to the volume of FIG. 1. The spike transfer function results in a circular boundary that outlines the circular shape in the volume of FIG. 1.

It has been found that the use of a spike transfer function typically works well in Direct Volume Rendering if an object to be outlined is smooth and its gradient is consistent. However, in some circumstances the use of a spike transfer function may be prone to artifacts.

The sharp boundary produced by a spike transfer function may be difficult for a rendering algorithm. Shading artifacts may occur. Pre-integration may reduce shading artifacts, but shading artifacts may remain to some extent.

If the thin layer is very thin, a rendering method that performs sampling at regular sampling intervals may sometimes hit the thin layer, and may sometimes step over it. The rendering of the thin layer may appear inconsistent to a viewer. For example, the thin layer may appear to have a varying thickness.

Pre-integration is a technique that involves using colors that are pre-computed for each interval between samples. In two-dimensional (2D) pre-integration, opacity and color values for each possible pair of intensity values and sample spacings are pre-computed using a transfer function and stored in a look-up table. In one-dimensional (1D) pre-integration, a 1D look-up table is used to approximate the functionality of the 2D pre-integration approach whilst reducing memory and processing burdens. One example of such a 1D approach is described in H. Kye et al, Interactive Classification for Pre-Integrated Volume Rendering of High-Precision Volume Data, Graphical Models, 70 (2008), 125-132.

FIG. 4 shows an example of an image comprising a thin layer, which may also be referred to as a thin hull. The image is rendered using regular volume rendering without pre-integration. The regular volume rendering struggles to resolve the thin layer consistently.

FIG. 5 shows the same image as FIG. 4, but the image is rendered using pre-integrated volume rendering. The pre-integrated volume rendering helps to produce an improved image, but some artifacts remain.

As shown in FIGS. 4 and 5, the use of a spike transfer function may result in artifacts. Additionally, it may only be possible to visualize certain types of boundaries using a spike transfer function. For example, it may be possible to visualize air-tissue and tissue-bone boundaries using a spike transfer function, but it may be more difficult to visualize boundaries between different types of tissue. Very strong intensity change may be required in order for a smooth surface to be obtained when rendering using a spike transfer function. Even when there is a strong intensity change, there may still be some issues with shading.

In ultrasound images in particular, a gradient across a surface may not be very consistent, which may cause difficulty in rendering using a spike transfer function.

If a spike transfer function is used, the thickness of the thin layer that is rendered depends on a rate of change of intensity across the thin layer. If an opacity stays consistent for multiple samples, the thin layer may be extended over all of the samples. It may be said that the intensity value stays within the spike for multiple samples. Where the layer is thicker, it appears less transparent in the rendered image. Where the layer is thinner, it appears more transparent. The difference in thickness may be visually unappealing, and may make the resulting rendered image more difficult to read.

SUMMARY

In a first aspect, there is provided a medical imaging apparatus comprising processing circuitry configured to: acquire a volumetric data set; acquire location information for a layer that is part of a structure represented in the volumetric data set; and perform a ray casting algorithm to generate a rendered image from the volumetric data set. The ray casting algorithm comprises, for each of a plurality of rays cast through a volume of the volume of the volumetric data set: determining data values for a plurality of sample positions along the ray; estimating, based on the location information, a position of an intersection point at which the ray intersects the layer; and using a precomputed function to determine a contribution of the intersection point to an aggregated color for the ray.

The contribution may be dependent on an angle between the layer and the ray. The contribution may be dependent on an angle between the layer and a direction of light from a light source.

The precomputed function may be a precomputed integral that integrates color and opacity across the layer in dependence on pre-determined properties of the layer.

The location information may comprise a geometry function defining a geometry of the layer.

The acquiring of the location information may comprise thresholding of data values in the volumetric data set. The acquiring of the location information may comprise thresholding of a further data set that is representative of the structure.

The acquiring of the location information may comprise segmentation of the volumetric data set. The acquiring of the location information may comprise segmentation of a further data set that is representative of the structure.

The acquiring of the location information may comprise applying a distance field to an external geometry. The acquiring of the location information may comprise performing a landmark clustering process. The acquiring of the location information may comprise tracking an iso-surface across multiple phases.

The location information may comprise a numerical function. The location information may comprise an analytical function. The location information may comprise a geometry function.

The structure may comprise an anatomical structure. The structure may comprise an organ. The structure may comprise a tumor. The structure may comprise a region of tissue.

The layer may be representative of a surface of the structure. The layer may be representative of an external structure. The layer may be representative of a navigation aid. The layer may be representative of an implant. The layer may be representative of an acquisition device.

The ray casting algorithm may further comprise, for at least some of the plurality of rays, estimating a position of a second intersection point at which the ray intersects the layer for a second time. The ray casting algorithm may further comprise using the precomputed function to determine the contribution of the second intersection point to the aggregated color for the ray.

The ray casting algorithm may further comprise, for at least some of the plurality of rays, estimating a position of a further intersection point at which the ray intersects a further, different layer that is part of a further structure represented in the volumetric data set. The ray casting algorithm may further comprise using the precomputed function or a further precomputed function to determine the contribution of the further intersection point to the aggregated color for the ray.

The ray casting algorithm may further comprise determining an ordering of the intersection point and further intersection point relative to a direction of the ray.

A value for the precomputed function at the intersection point may be dependent on whether the ray intersects the layer so as to pass from a first side of the layer to a second side of the layer, or the ray intersects the layer so as to pass from the second side of the layer to the first side of the layer.

The contribution may be dependent on wavelength, thereby providing a thin film effect.

The ray casting algorithm may be a global illumination algorithm. The ray may be a photon ray performing photon mapping.

The volumetric data set may comprise at least one of CT data, MR data, PET data, cone-beam CT data, X-ray data, ultrasound data.

In a further aspect, which may be provided independently, there is provided a method comprising: acquiring a volumetric data set; acquiring location information for a layer that is part of a structure represented in the volumetric data set; and performing a ray casting algorithm to generate a rendered image from the volumetric data set. The ray casting algorithm comprises, for each of a plurality of rays cast through a volume of the volume of the volumetric data set:

determining data values for a plurality of sample positions along the ray; estimating, based on the location information, a position of an intersection point at which the ray intersects the layer; and using a precomputed function to determine a contribution of the intersection point to an aggregated color for the ray.

In a further aspect of the invention, which may be provided independently, there is provided a medical imaging method comprising a ray casting algorithm; a thin hull geometry specified by a user defined R3→R function; and a precomputed integral of the hull profile in regards to the angles of the surface and relative the ray/light in which the ray casting algorithm detect the transition across the hull geometry, steps back to hull and applies the precomputed color integral based on the hull's angle relative the ray and light.

The hull geometry function may be provided by one or a combination of 1 to 6:
1. Primary volume/threshold
2. Secondary or additional volume/threshold
3. Segmentation object
4. External geometry provided as a distance field
5. A iso-surface tracked across multiple phases
6. Analytical function The precomputed color integral may also capture wavelength dependent thin film effects.

Stepping across the hull from the outside may be integrated differently from stepping across the hull from the inside.

In a further aspect, which may be provided independently, there is provided a medical imaging apparatus comprising processing circuitry configured to: acquire a location information of a layer that is part of a structure in a volume data, wherein the structure is a target for volume rendering process; set a position of a sample point corresponding to a ray used in a ray casting algorithm based on the location information; calculate ray casting calculation for the volume data by using the position of the sample point and generate a rendering image.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF DRAWINGS

Embodiments are now described, by way of non-limiting example, and are illustrated in the following figures, in which.

DETAILED DESCRIPTION

Figure 6:
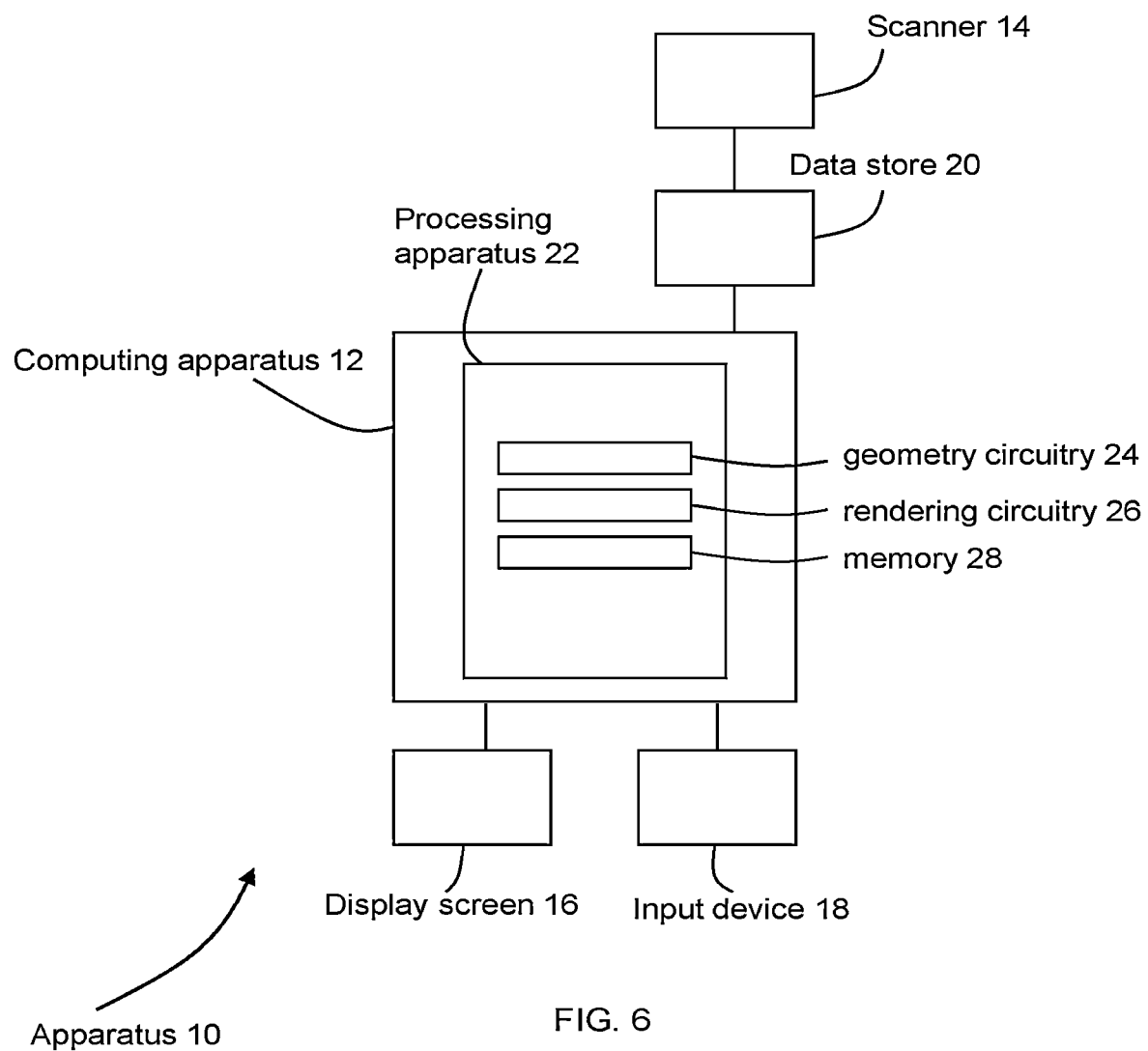
FIG. 6 is a schematic illustration of an apparatus in accordance with an embodiment.

A medical image processing apparatus 10 according to an embodiment is illustrated schematically in FIG. 6. The medical image processing apparatus 10 may also be referred to as a medical imaging apparatus.

The medical image processing apparatus 10 comprises a computing apparatus 12, in this case a personal computer (PC) or workstation, which is connected to a scanner 14 via a data store 20.

The medical image processing apparatus 10 further comprises one or more display screens 16 and an input device or devices 18, such as a computer keyboard, mouse or trackball.

In the present embodiment, the scanner 14 is a CT (computed tomography) scanner which is configured to obtain volumetric CT scans. The scanner 14 is configured to generate image data that is representative of at least one anatomical region of a patient or other subject. The image data comprises a plurality of voxels each having a corresponding data value, which in the case of CT scanning is an intensity value, for example a value in Hounsfield units.

In other embodiments, the scanner 14 may be configured to obtain two-, three- or four-dimensional image data in any imaging modality. For example, the scanner 14 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 14 are stored in data store 20 and subsequently provided to computing apparatus 12. In an alternative embodiment, image data sets are supplied from a remote data store (not shown). The data store 20 or remote data store may comprise any suitable form of memory storage. In some embodiments, the medical image processing apparatus 10 is not coupled to any scanner.

Computing apparatus 12 comprises a processing apparatus 22 for processing of data. The processing apparatus comprises a central processing unit (CPU) and Graphical Processing Unit (GPU). The processing apparatus 22 provides a processing resource for automatically or semi-automatically processing medical image data sets. In other embodiments, the data to be processed may comprise any image data, which may not be medical image data.

The processing apparatus 22 includes geometry circuitry 24 configured to determine and apply a geometry function that is representative of a thin layer; rendering circuitry 26 configured to render an image from volumetric image data; and a memory 28.

In the present embodiment, the circuitries 24, 26 and the memory 28 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 6 for clarity.

Figure 7:
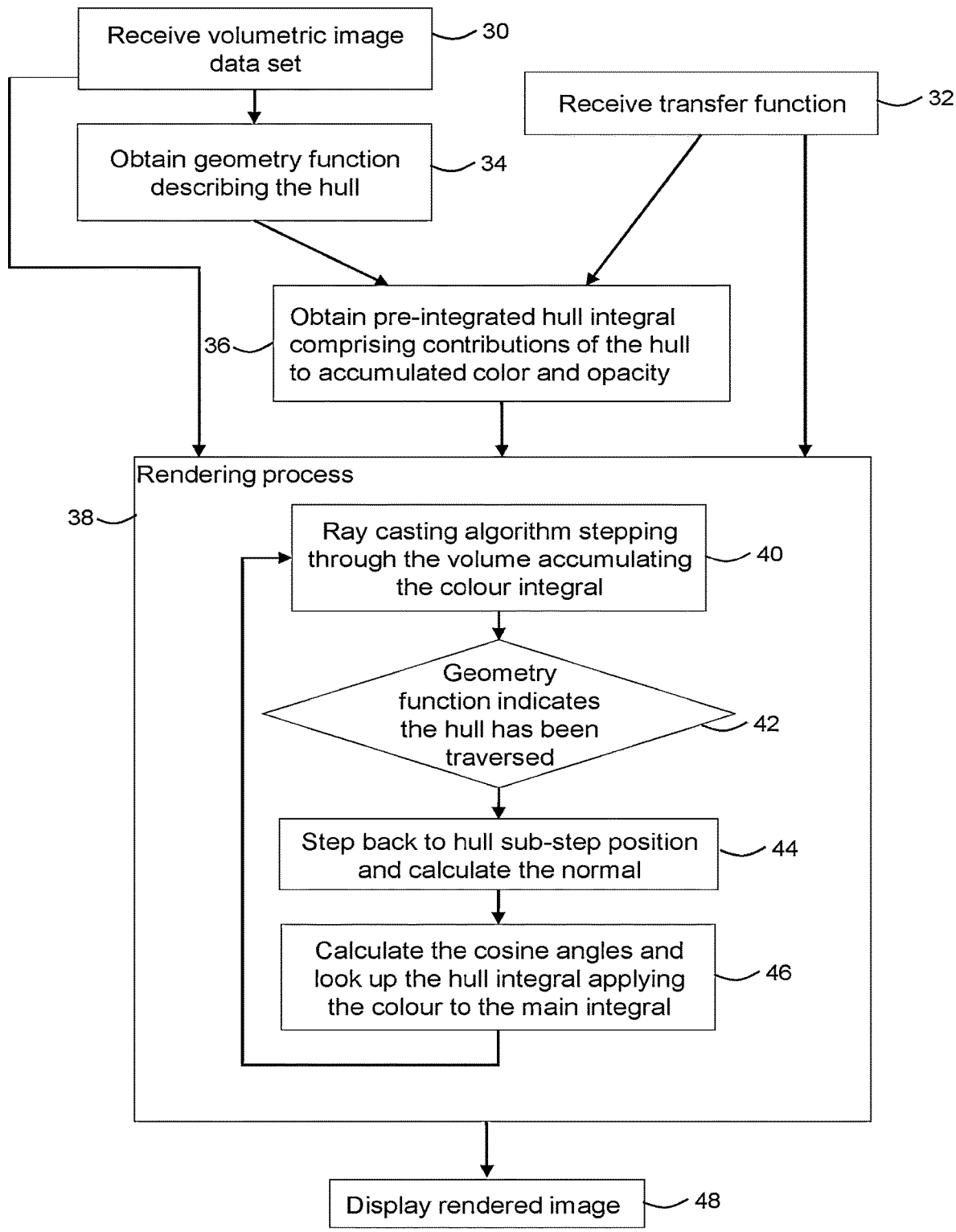
FIG. 7 is a flow chart illustrating in overview a method in accordance with an embodiment.

The apparatus of FIG. 6 is configured to perform a method of processing medical image data as illustrated in FIG. 7.

FIG. 7 is a flow chart illustrating in overview a rendering method in accordance with an embodiment. In the discussion of rendering below, which comprises a ray-casting method, processes (for example, the traversal of a surface or the lighting of a surface) may be referred to as if they occurred in a physical space. However, it will be apparent that the processes being described are virtual (simulated) processes occurring as numerical operations on a volumetric image data set. Although the stages of FIG. 7 are described in a particular order, in other embodiments the stages of FIG. 7 may occur in any suitable order.

At stage 30 of FIG. 7, the rendering circuitry 26 receives a volumetric image data set obtained from a CT scan performed by scanner 14. The volumetric image data set comprises respective data values for a plurality of voxels of the volumetric image data set. The data values are representative of intensity values. In further embodiments, the volumetric image data set may comprise any suitable medical image data in any appropriate modality. In further embodiments, the volumetric image data set may comprise any appropriate image data, which may not be medical.

At stage 32, the rendering circuitry 26 receives a transfer function relating data values to color and opacity values. In the present embodiment, the color values are RGB values. The transfer function assigns a respective red, green, blue and alpha (opacity) value to each data value in a range of data values. In other embodiments, the color values may be described in any suitable color space. The color values may be greyscale values.

At stage 34, the geometry circuitry 24 obtains location information. The location information comprises a geometry function describing a thin hull, which may also be described as a layer or as a shell. In the present embodiment, the thin hull is closed. In other embodiments, the thin hull may be open. The thin hull may comprise one or more holes. The thin hull may be convex, or not convex, in different embodiments.

The geometry function is a continuous function $\mathbb{R}^3 \rightarrow \mathbb{R}$. The geometry function may be described as a user-defined function. A process of obtaining the location information may comprise a manual user input. A user may select a type of geometry function to be used. A user may modify a scene manually to define exactly where the layer is.

The hull may be considered to form a surface boundary of an anatomical structure to be rendered. For example, the anatomical structure may be a lung, a heart or a head. In some embodiments in which the volumetric image data set is representative of ultrasound data, the anatomical structure may be a fetus or part of a fetus.

The hull is to be rendered such that it is mostly transparent. The hull is to be rendered to provide a glass view in which a user is aware of the presence of the hull, but can see features that are within or behind the hull.

In the present embodiment, the geometry circuitry 28 processes the volumetric image data set to obtain the geometry function describing the hull. In other embodiments, the geometry circuitry 28 may receive the geometry function from other circuitry of the medical image processing apparatus 10, or from a further apparatus.

In the present embodiment, the processing of the volumetric image data set to obtain the geometry function comprises a combination of volume thresholding of the volumetric image data set and segmentation of the volumetric image data set. The volume thresholding comprises applying a threshold value to data values in the volumetric image data set to distinguish voxels having a data value below the threshold value from voxels having a data value above the threshold value. Thresholding may be used, for example, to distinguish voxels that are representative of a first type of tissue from voxels that are representative of a second type of tissue.

The segmentation comprises a process of identifying voxels representing the anatomical structure, which may be performed using any suitable segmentation method. The segmentation method may comprise anatomy or pathology segmentation using an analysis package, for example an analysis package that is based on deep learning. The segmentation may comprise manual editing, and semi-automatic edge tracing tools such as, for example, the live wire technique. The segmentation method may comprise morphological modifications such as, for example, erode, dilate, open or close.

In other embodiments, any suitable method may be used to determine a geometry function that is representative of the hull. The method may comprise thresholding of the volumetric image data set, which may be referred to as a primary volume. The method may comprise thresholding of a second volumetric image data set, which may be referred to as a secondary volume or fusion volume. The secondary volume may be representative of the same anatomy as the primary volume. The secondary volume may be acquired at a different time than the primary volume. The secondary volume may be acquired using a different modality from that used to acquire the primary volume, for example using a different type of scanner. In a method in which thresholding of the secondary volume is used to obtain the geometry function, there may be an additional step in which a registration between the primary volume and secondary volume is performed.

The method of determining the geometry function may comprise any suitable form of segmentation of any suitable object in the volumetric image data set.

In some embodiments, a geometry function comprises or is obtained from a distance field, for example a signed distance field. An external geometry may be provided as a distance field. The external geometry may comprise a geometry that is not obtained from the volumetric image data set. The external geometry may comprise, for example, a highlighting of a region. In some embodiments, the external geometry may comprise or be obtained from a model of an implant. The external geometry may be used to simulate experimental fitting of the implant before the implant is physically fitted. The external geometry may be representative of at least one navigation aid. For example, the navigation aid may comprise at least one arrow or other symbol. The navigation aid may comprise geometry that is indicative of a path, for example a long tube. The external geometry may be representative of an acquisition device, for example an ultrasound probe.

A signed distance field (in three dimensions) is a continuous function $\mathbb{R}^3 \rightarrow \mathbb{R}$ having values which are representative of a distance to a boundary of an object. The signed distance field may be written as f(x, y, z). The value of f(x, y, z) at each point within the interior of the object is the negated minimum distance from the point to the boundary of the object. The value of f(x, y, z) at each point exterior to the object is the minimum distance from the point to the boundary. A signed distance field contains a representation of a surface of the object. The surface is where the signed distance field f(x, y, z) is zero.

In some embodiments, landmark clustering regions may be used to obtain a geometry function for the hull. The obtaining of the geometry function may comprise determining distances to a plurality of points, for example a plurality of landmarks. In other embodiments, other derived volumetric regions may be used. In some embodiments, a landmark algorithm may be used to find points of anatomy. For example, a landmark algorithm may be used to find points of anatomy within the liver. Geometry may be fitted to the points of anatomy and rendered using a method as described below. The geometry that is fitted to the points of anatomy may comprise a simple geometry such as a bounding sphere, or the smallest smooth object encompassing all the points. In other embodiments, the geometry that is fitted to the points of anatomy may comprise a model, for example a liver model, that is fitted to match the points. A central difference method may be used to obtain the geometry function.

The geometry function may represent an iso-surface, which is a surface of constant data value, for example constant intensity.

In some embodiments, a surface across multiple phases may be presented as a set of separate hulls. An iso-surface may be tracked across multiple phases. For example, a set of images of the heart may comprises images acquired at different phases of the movement of the heart. Moving anatomy from multiple scans may be projected into one scene, possibly with data from one of the scans. Combining the layers into one scene may form away to visualize a difference in shape across a sequence without actually playing an animation.

In further embodiments, any form of location information may be used to represent a geometry of the hull.

In the present embodiment, the geometry function is determined by the geometry circuitry 24. In other embodiments, the geometry function may be determined by the rendering circuitry 26, or by any suitable circuitry of the medical image processing apparatus 10. The geometry function may be obtained by a further apparatus and passed to circuitry of the medical image processing apparatus 10. The geometry function may be obtained in a pre-processing stage before the method of FIG. 7 begins.

In the present embodiment, the geometry function is determined by processing the volumetric image data set. In other embodiments, the geometry function may be determined based on any suitable data set or data sets.

In the present embodiment, the geometry function describes the hull as an infinitely thin layer. The hull is treated as infinitely thin when considering sampling positions along a ray, as described below with reference to stage 38. However, a thickness is assigned to the hull when calculating contributions of the hull to the color value accumulated by the ray, as described below with reference to stage 36. In other embodiments, a geometry function is calculated that includes a thickness of the hull, but that thickness is discounted when considering sampling positions.

At stage 36, the rendering circuitry 26 pre-calculates contributions of the hull to accumulated color and opacity along a ray. The pre-calculating of the contributions is performed in advance of a ray casting being performed at stage 38. The pre-calculating comprises a pre-integration of an entire parameter space of the hull. The pre-integrated values may be computed discretely (numerically) or analytically.

For the pre-integration, the rendering circuitry 26 receives or assigns a pre-defined set of properties to the hull. The set of properties comprises a thickness and one or more material properties, for example attenuation. In the present embodiment, the rendering circuitry 26 assigns a constant thickness to the hull. The rendering circuitry 26 defines the hull as having constant material properties, for example constant attenuation. In other embodiments any suitable set of properties may be used. The set of properties may comprise a profile of the thin hull and its color and opacity. The color and opacity may be specified as a color opacity table. In some embodiments, the profile may be so predictable that transfer function input is not required.

In the pre-integration, the rendering circuitry 26 determines a contribution of a hull to a ray that passes through the hull. The contribution comprises a color and an opacity. The contribution of the hull is dependent on an angle at which the ray intersects the hull. In the present embodiment, the contribution of the hull is also dependent on an angle at which the hull is illuminated by a light source.

Figure 8:
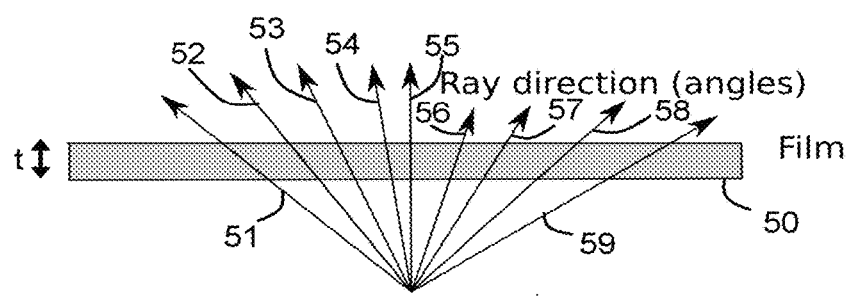
FIG. 8 is a schematic illustration of a plurality of rays intersecting a hull at different ray angles.

FIG. 8 illustrates the traversal of a hull 50 having a constant thickness t. The hull may also be referred to as a film or as a layer. The hull 50 is traversed by a plurality of rays 51, 52, 53, 54, 55, 56, 57, 58, 59, which may also be referred to as view rays. Each ray 51 to 59 traverses the hull 50 at a different angle. Each ray 51 to 59 has a different ray direction.

A ray that traverses the hull 50 at a steep angle passes through a greater thickness of material than a ray that traverses the hull 50 at an angle close to the normal. For example, in FIG. 8, rays 51 and 59 pass through a greater thickness of material than ray 55.

Figure 9:
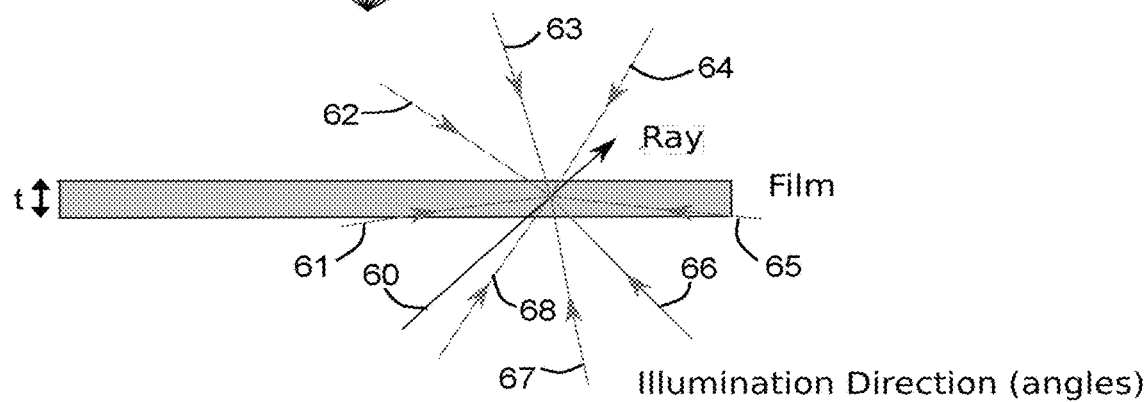
FIG. 9 is a schematic illustration of light incident on a hull from different light angles.

FIG. 9 illustrates a plurality of light directions 61, 62, 63, 64, 65, 66, 67, 68 in combination with a single ray 60. The light directions may also be referred to as illumination angles. Different illumination angles result in different lighting effects. For example, when there is a steep angle between the ray and the hull, and a steep angle between the light direction and the hull, the surface shadows itself and appears dark. An angle determines how much light is attenuated through the hull.

The rendering circuitry 26 pre-integrates a color and opacity contribution that results from the ray intersecting the hull for each possible combination of ray angle and illumination angle. The material of the hull is consistent, and the hull has constant thickness when the thickness is measured in the direction of the normal. Therefore, the hull contributes a greater color and opacity to the ray when it is intersected at a large angle from the normal than when it is intersected at an angle that is close to the normal.

Figure 10:
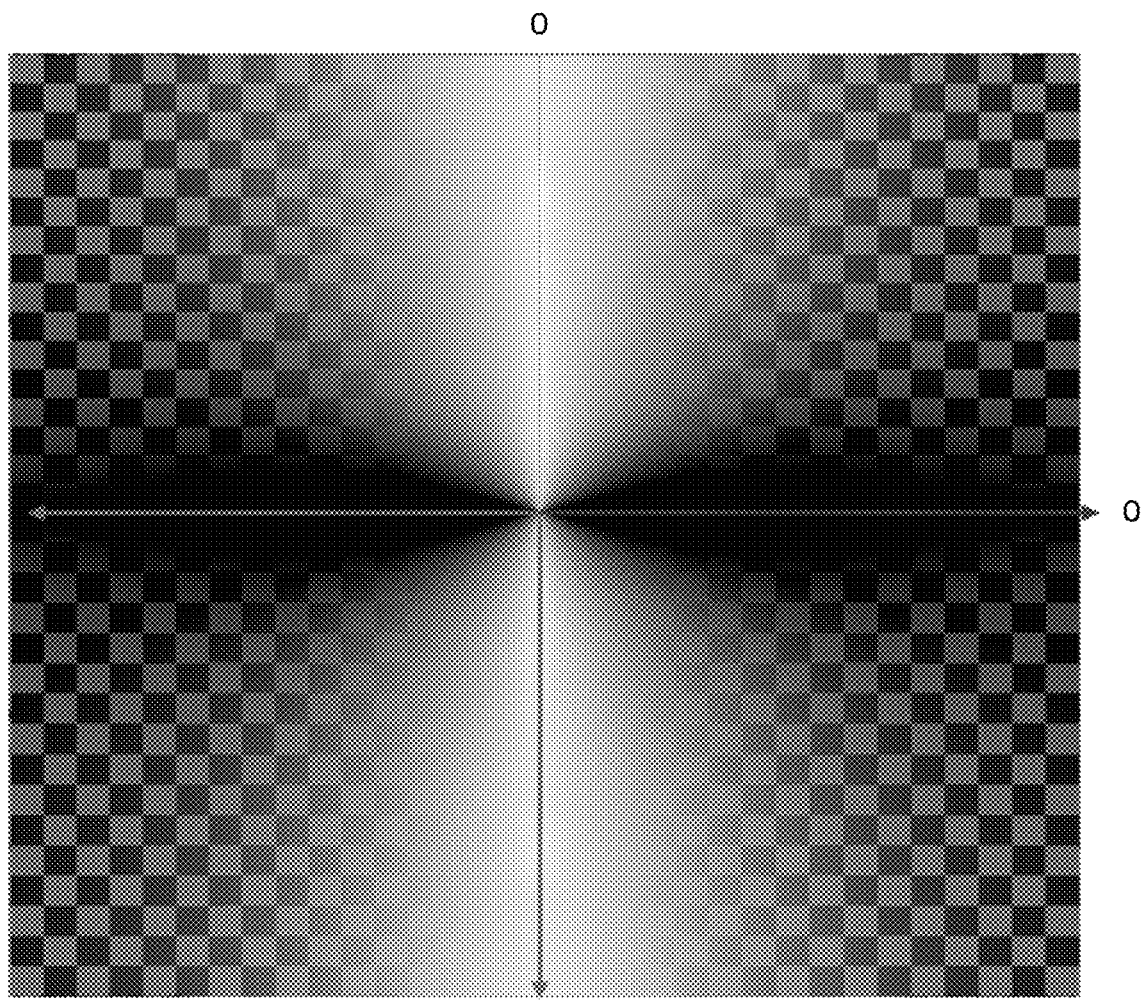
FIG. 10 is a plot that is representative of a complete integral space of a hull.

FIG. 10 is representative of a complete integral space of the hull, and shows the color and opacity contribution of the hull at each angle. Since the image of FIG. 10 is reproduced in greyscale rather than in full color, the color contribution is shown in grey.

The integral space is shown using a checkerboard background. The checkerboard is less visible in parts of the space where the contribution has greater opacity.

An x-axis (horizontal axis) of FIG. 10 represents the cosine of an angle between the hull and the ray. The angle, which may be denoted as ray_angle, is defined as the angle between the ray and a normal to the hull. The angle ray_angle may also be described as an angle to a camera, since the ray may be considered to be cast from a camera position.

A horizontal mid-point of FIG. 10 is at cos(ray_angle)=0, which occurs when ray_angle is 90 degrees. An angle close to 90 degrees may be described as a steep angle relative to the hull, or may be described as skimming the hull.

Negative values of x are representative of the ray traversing the hull from the inside of the hull to the outside of the hull. Positive values of x are representative of the ray traversing the hull from the outside of the hull to the inside of the hull. In the present embodiment, the contributions for negative values of cos(ray_angle) and positive values of cos(ray_angle) are symmetric. The contribution from a ray going from inside to outside the hull is the same as the contribution from a ray going from outside to inside the hull. In other embodiments, the contributions for positive and negative values may differ. The contribution from a ray going from inside to outside the hull may be different from the contribution of a ray going from outside to inside the hull. Stepping across the hull from the outside to the inside may be integrated differently from stepping across the hull from the inside to the outside.

A y-axis (vertical axis) of FIG. 10 represents the cosine of an angle between the hull and a light direction. This angle, which may be denoted as light_angle, is defined as the angle between light direction and a normal to the hull.

A vertical mid-point of FIG. 10 is at cos(light_angle)=0, which occurs when light_angle is 90 degrees. Negative values of y are representative of the light source being positioned inside the hull and light traversing the hull from the inside of the hull to the outside of the hull. Positive values of y are representative of the light source being outside the hull and light traversing the hull from the outside of the hull to the inside of the hull. In the present embodiment, the contributions for negative values of cos(light_angle) and positive values of cos(light_angle) are symmetric. In other embodiments, the contributions for positive and negative values may differ.

Near (0,0), both the ray and the light skim the surface of the hull. Near (1,0) the view ray points straight at the hull, but the light skims the surface. Whenever cos(ray_angle) is near zero, the angle is very steep and the ray passes through a large amount of material, resulting in greater opacity.

Pre-integrated contributions for all values of cos(ray_angle) and cos(light_angle) are stored in memory 28. In the present embodiment, the pre-integrated contributions are stored as a look-up table, which represents all possible interactions with the hull. In other embodiments, the pre-integrated contributions may be stored as a look-up table or as a list, or in any suitable format.

The pre-integrated contributions may be referred to as a pre-integrated hull integral.

In some embodiments, the pre-integrated contributions include thin film effects. Thin film effects may occur if the thickness of the hull is similar to a wavelength of light used to illuminate the hull. If the thickness of hull is similar to a wavelength, a color that is seen in rendering is determined by an angle at which the hull is illuminated. A color contribution varies with angle, and is wavelength dependent. The color across the hull varies, for example in a manner similar to the color variation that may be seen on a soap bubble.

In some embodiments, the pre-integrated contributions are approximated using any suitable approximation. In other embodiments, use of an accurate integral may be prioritized, for example when the hull is very thin.

In the present embodiment, the pre-integration of stage 36 is performed by the rendering circuitry 26. In other embodiments, the pre-integration may be performed by any suitable circuitry of the medical image processing apparatus 10, or by a further apparatus. In some embodiments, the pre-integration may be obtained in a pre-processing stage before the method of FIG. 7 begins.

At stage 38, the rendering circuitry 26 performs a rendering process to render an image from the volumetric image data set. The rendering circuitry 26 determines a virtual camera position and gaze direction from which the volume of the volumetric image data set is to be viewed, and thereby determines a virtual image plane. The rendering circuitry 26 casts a plurality of virtual rays into the volume of the volumetric image data set. Each ray corresponds to a respective pixel of a 2D image that is to be obtained by rendering.

Stage 38 comprises a plurality of individual stages 40 to 46 that are performed for each of the plurality of rays.

Consider one of the rays cast into the volume. At stage 40, the rendering circuitry 26 starts stepping through the volume accumulating a color integral along the ray, in accordance with a conventional ray-casting method.

The rendering circuitry 26 samples data values, for example intensity values, at a plurality of sample points along a path of the ray through the volumetric data set. In the present embodiment, the sample points are equally spaced along the ray. In other embodiments, any suitable sample spacing may be used, which may be varying or adaptive. The rendering circuitry 26 determines a respective opacity and color value for each of the sample points using the transfer function obtained at stage 32. The rendering circuitry 28 accumulates contributions from each sample point by compositing the opacity and color values along the ray.

At stage 42, the rendering circuitry 26 uses the geometry function obtained at stage 34 to detect that the ray has traversed the hull.

Figure 11:
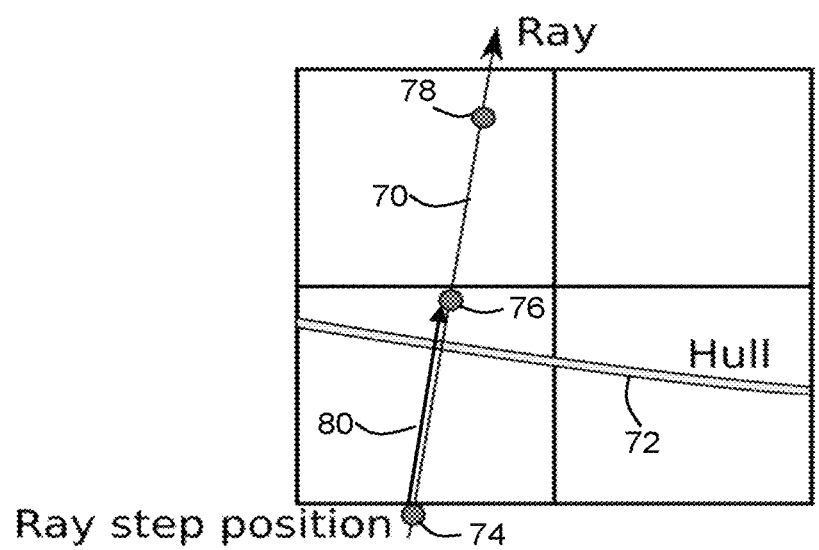
FIG. 11 is a schematic illustration of a ray intersecting a hull, showing sample positions.

FIG. 11 illustrates a part of a ray 70 that intersects a hull 72, which may also be called a layer or shell. Although the hull 72 is illustrated in FIG. 11 as having a thickness, it is treated by the rendering circuitry 26 at stage 42 as if it were infinitely thin. The part of the ray illustrated in FIG. 11 comprises three sample points 74, 76, 78.

The rendering circuitry 26 samples a data value at a first sample point 74 and determines a contribution for that sample point 74. The contribution comprises color and opacity. The color comprises respective values for red, green and blue. The rendering circuitry 26 composites the contribution for the sample point 74 with those of any preceding sample points of the ray that are not illustrated in FIG. 11 to obtain an accumulated color and opacity.

The rendering circuitry 26 proceeds to the second sample point 76 on the ray 70. A step between the first sample point 74 and the second sample point 76 is illustrated by arrow 80.

In stepping from first sample point 74 to second sample point 76, the rendering circuitry 26 determines that it has stepped over the hull 72 which is positioned between the first sample point 74 and the second sample point 76. The determination that the hull 72 is positioned between the first sample point 74 and the second sample point 76 is based on the geometry function.

The rendering circuitry 26 estimates a position of an intersection point at which the hull is traversed by the ray.

When estimating the intersection point, the hull is treated as an infinitely thin surface. The hull is defined such that it has a thickness that is much thinner than a voxel, and much thinner than a renderer step along a ray representing a pixel. In the rendering of stage 38, is not possible for a ray to step to a location that is within the boundary formed by the hull. Instead, the hull will always be stepped over by the ray.

The estimated position of the intersection point may also be referred to as an estimated sub step position of the hull. A method of estimating the position of the intersection point may be dependent on how the geometry function is defined. The method of estimating the position may comprise a gradient descent method, for example for threshold and signed distance fields. In functions for which the gradient descent method is not possible, the rendering circuitry 26 may employ a binary search to a specific degree of precision.

The rendering circuitry 26 steps back along the ray to the estimated sub step position of the hull. The sub step position is between a position of the first sample point 74 and a position of the second sample point 76.

The rendering circuitry 26 computes a surface normal of the hull 72 at the intersection point. The geometry function is differentiable such that it is possible to determine a normal to the hull at each point on the hull. For example, the surface normal may be computed by calculating a gradient using any appropriate gradient estimation technique. In other embodiments, an orientation of the surface may be defined as a separate function rather than by the geometry function itself.

Figure 12:
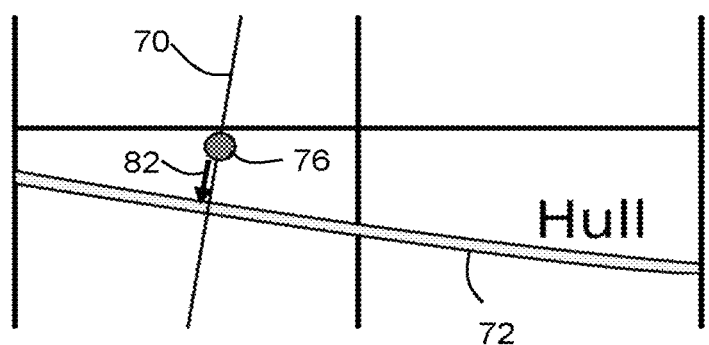
FIG. 12 is a close up view of an interval between a sample point and the hull of FIG. 11.

FIG. 12 illustrates a step back from sample point 76 to the intersection point between the ray 70 and the hull 72. The step back is illustrated with arrow 82.

At stage 44, the rendering circuitry 26 calculates a cosine of the angle between the normal and the ray, cos(ray_angle). The rendering circuitry 26 calculates a cosine of the angle between the normal and a lighting direction, cos(light_angle). It is noted that. in general, determining the cosine of an angle between vectors may be easier that determining the angle itself. Therefore, storing and calculating cosine values may be more efficient that storing and calculating angle values, which may be relevant to performance.

The rendering circuitry looks up the pre-integrated values of the hull integral that are stored in the memory 28, which comprise a color value and an opacity value. The rendering circuitry 26 applies the color and opacity to the main integral being accumulated along the ray, using the sub step position.

Once the contribution of the hull 72 is added to the accumulated color and opacity values, the rendering process returns to stage 38 and continues to sample at sample points along the ray, including third sample point 78.

In some circumstances, a single ray may pass through a hull 72 more than once. For example, the hull 72 may form a closed shell. A ray 70 may pass through a first side of the hull 72 from outside to inside, then through a second side of the hull 72 from inside to outside. The hull 72 may comprise one or more folds that may cause the ray to pass through the hull 72 twice, three times, four times, or more.

If the ray passes through the hull 72 more than once, stages 42 to 46 are repeated for each time the ray traverses the hull 72. A respective contribution is added to the ray each time the ray traverses the hull 72.

In some embodiments, more than one hull is present. For example, a first hull may represent a boundary of a first anatomical structure, and a second hull may represent a boundary of a second anatomical structure.

A plurality of geometry functions may be obtained, each representative of a respective one of a plurality of hulls. Respective contributions from each of the plurality of hulls may be pre-calculated and stored in respective look-up tables.

If the hulls do not coincide, and there is no instance in which two or more hulls occur in a given interval between adjacent sampling points, rendering may proceed as described above with reference to FIG. 7. The rendering circuitry 26 determines when one of the hulls is traversed. When the hull is traversed, the rendering circuitry 26 determines which of the hulls was traversed, and looks up the appropriate look-up table that gives the contribution for that hull.

If two of more intersections of the hull 72 occur in an interval between a first sampling point and a second sampling point where the first and second points are adjacent, the rendering may determine an order of the intersection points to determine in which order to accumulate the contribution of the two hulls. If the two hulls coincide, the rendering circuitry 26 may designate one hull as an inside hull and the other hull as an outside hull in dependence on a pre-determined rule. By designating one hull as inside and one hull as outside, the rendering circuitry 26 may determine an order in which to add the contributions of the hulls.

Stages 40 to 46 are repeated for each of the rays to obtain color values for each of the pixels in a rendered image. Color and opacity values are accumulated along each of the rays. The accumulated color and opacity values for a given ray include any contribution from a hull or hulls intersected by that ray. In the ray casting process, the hull 72 is treated as an infinitely thin surface for which a fixed color and opacity value is used as calculated at stage 36.

At stage 48, the rendering circuitry 26 displays the rendered image on the display screen 16 or on another one or more display screens. In some other embodiments, the rendered image may not be displayed, but may instead be provided to further circuitry for further operations to be performed on data representative of the rendered image.

The method of FIG. 7 may provide a fast way to create high quality glass-like hulls, or shells. The method of FIG. 7 may be faster than using a known glass-like preset. Each shell has an exact opacity and does not have varying thickness. The method can be controlled with segmentation. The geometry function may be considered to be very flexible, and in particular more flexible than the mapping from intensity to color that the volume rendering preset defines. Better and faster rendering performance may be achieved.

The rendering of the hull is performed by a simple look-up of the contributions that are pre-calculated using the geometry function. A thin hull may be rendered consistently in a single step. It is assumed that the rendering steps will never sample the hull exactly, but instead the hull will always be between two sample steps. A volumetric integral is applied in exactly one step.

The assigning of a thickness to the hull when pre-calculating a contribution of the hull allows a glass view effect to be achieved in which an outline of the structure is visible in the rendered image. When pre-calculating the contribution, a thickness seen from the ray is dependent on an angle between the ray and the hull. A rendered image is obtained in which the hull appears to have a consistent thickness.

In some previously-existing methods, thin hulls were incorporated in volume rendering by targeting the partial volume boundary in the transfer function. Such pre-existing method may be considered to be less than ideal. It has been found that only select boundaries may be possible with reasonable quality. Artifacts may be present.

The method of FIG. 7 works by pre-computing a hull, including its shading. An efficient and substantially artifact-free hull visualization may be obtained. A user defined function may be used to describe the hull geometry. The geometry function may be applied independently of the volume being rendered. This may allow for freedom to express complex geometry. In some circumstances, a perfectly or near-perfectly consistent hull may be obtained.

It has been found that the use of pre-integration of the hull integral may provide rich shading. Subtle transitions between higher opacity and lower opacity regions of a hull may be obtained. If the geometry function defines a good surface, the surface may appear to have perfect resolution in a rendered image.

Surfaces may become considerably clearer. In embodiments where a hull curves in on itself or has a complex shape, it may be particularly important that the hull appears to have a consistent thickness.

In some cases, multiple surfaces may be shown. The presence of numerous and complex surfaces may make an image difficult to interpret. In such cases, having a clear appearance of the surfaces may be particularly helpful.

Figure 1:
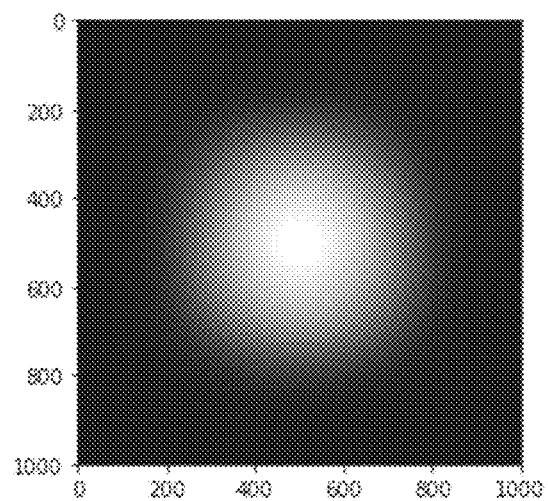
FIG. 1 is a simplified representation of a volume having spatial variation in intensity.
Figure 2:
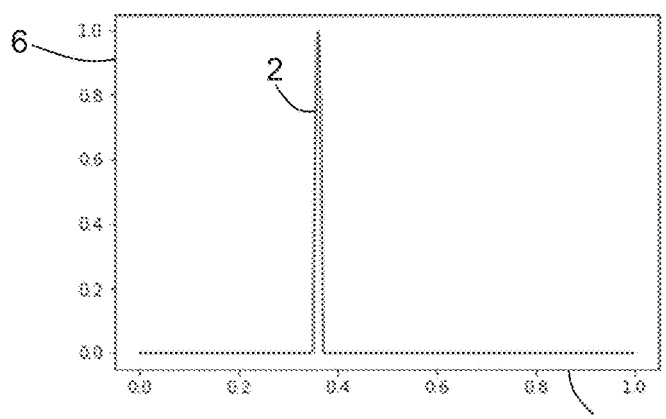
FIG. 2 is a plot of a spike transfer function.
Figure 3:
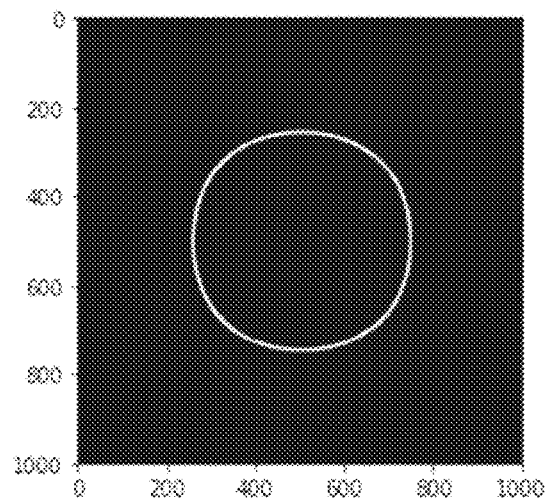
FIG. 3 is an image showing a result of the spike transfer function of FIG. 2 being applied to the volume of FIG. 1.
Figure 4:
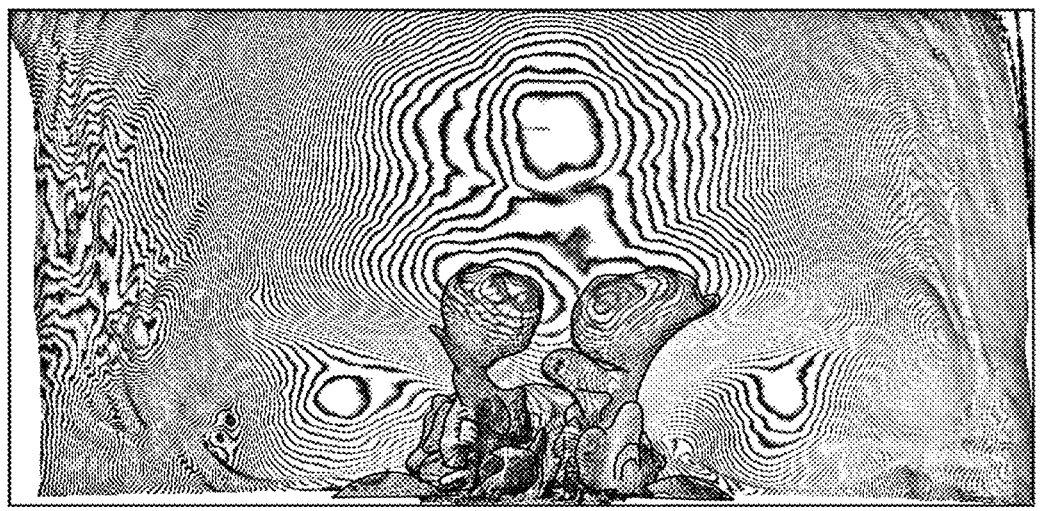
FIG. 4 is an example of an image rendered using regular volume rendering without pre-integration.
Figure 5:
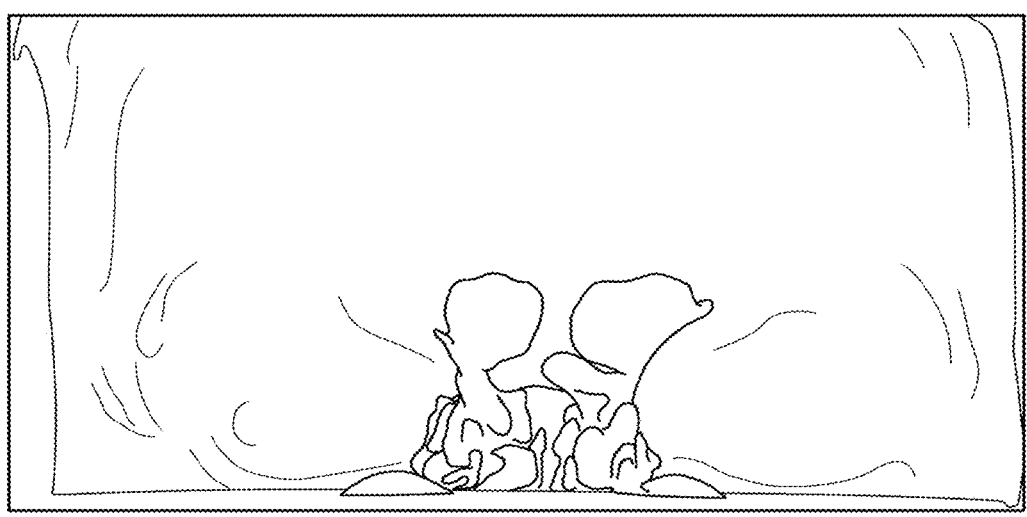
FIG. 5 is an example of an image rendered using regular volume rendering with pre-integration.
Figure 13:
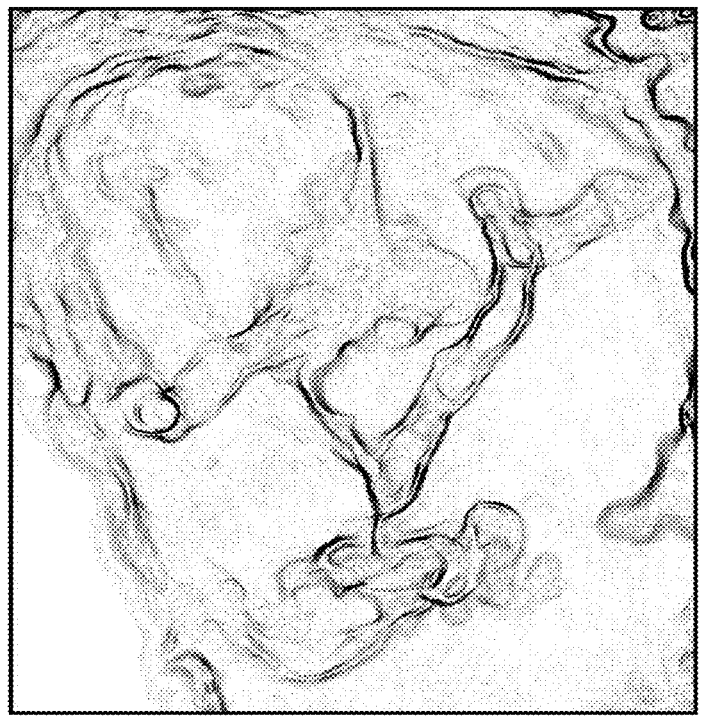
FIG. 13 is an ultrasound image rendered using a known rendering method.

FIG. 13 shows an ultrasound image rendered using a known rendering method in which pre-integration of the hull is not used. The hull is represented using a spike transfer function as described above with reference to FIGS. 1 to 3, with pre-integration of sample pairs. The surface appears unclear due to an apparent variation in the thickness of the surface. Some areas of the surface are thicker, and so appear less transparent. Some areas are thinner, and appear more transparent. Multiple surfaces may be difficult to distinguish.

Figure 14:
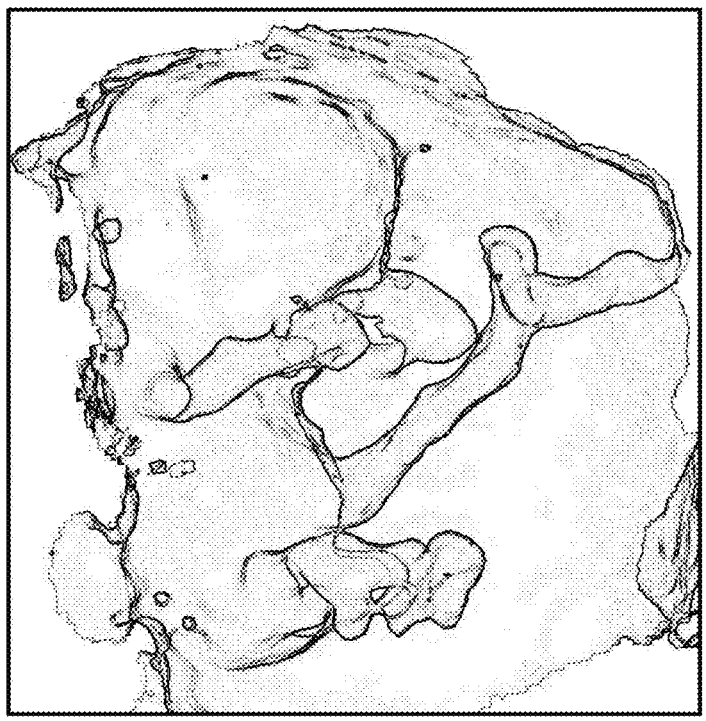
FIG. 14 is an ultrasound image rendering using a method in accordance with an embodiment.

FIG. 14 shows the same image rendered using the method of FIG. 7. It may be seen that the surface appears simpler and clearer in FIG. 14 than in FIG. 13.

The method of FIG. 7 may also be compatible with global illumination rendering. Embodiments described above are described with reference to a view ray that is used in single-pass rendering. A light direction is considered as part of the single rendering pass. A thickness seen from the ray is dependent on the angle to the hull.

In global illumination embodiments, a first pass is performed in which light rays are cast into a volume to obtain a photon map comprising irradiance values. A second pass is performed in which view rays are cast into the volume and accumulate irradiance values. In global illumination embodiments, a thickness seen from a light ray is dependent on an angle between the photon ray and the hull. A relation between the photon ray and the hull may be considered to be similar between that between the ray and the hull in the embodiments described above. When determining the photon map, only the cosine of the angle between the photon ray and the normal to the hull is used, so the table of pre-integrated values becomes one-dimensional.

The first pass needs to consider the hull since the hull will cast a shadow. The second pass considers the lighting integration of the hull since the limited thickness of the hull means that the hull may correspond poorly to a single voxel neighborhood.

In some embodiments, a plurality of look-up tables may be obtained using different optical models. A global illumination rendering may make use of several look-up tables. The tables may be representative of different geometric functions.

Although the embodiments above are described with regard to medical imaging data, in other embodiments any data may be rendered using methods described above. For example, the data may comprise oil and gas data. The data may comprise three-dimensional microscopy data. The data may comprise, for example, climate data, geological surveys, demographics or games data.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical imaging apparatus, comprising:
processing circuitry configured to
acquire a volumetric data set,
acquire location information including a geometry function describing a hull that forms a surface boundary of a structure represented in the volumetric data set, and
perform a ray casting algorithm to generate a rendered image from the volumetric data set, wherein the ray casting algorithm comprises, for each ray of a plurality of rays cast through a volume of the volumetric data set:
determining data values for a plurality of sample positions along the ray,
estimating, based on the location information, a position of an intersection point at which the ray intersects the hull, and
using a precomputed function to determine a contribution of the intersection point to an aggregated color for the ray.

2. The medical imaging apparatus according to claim 1, wherein the contribution is dependent on an angle between the hull and the ray.

3. The medical imaging apparatus according to claim 1, wherein the contribution is dependent on an angle between the hull and a direction of light from a light source.

4. The medical imaging apparatus according to claim 3, wherein the contribution is dependent on wavelength, thereby providing a thin film effect.

5. The medical imaging apparatus according to claim 1, wherein the precomputed function is a precomputed integral that integrates color and opacity across the hull in dependence on pre-determined properties of the hull.

6. The medical imaging apparatus according to claim 1, wherein the location information comprises the geometry function, which defines a geometry of the hull.

7. The medical imaging apparatus according to claim 1, wherein the acquiring of the location information comprises thresholding of data values in the volumetric data set or in a further data set that is representative of the structure.

8. The medical imaging apparatus according to claim 1, wherein the acquiring of the location information comprises segmentation of the volumetric data set or of a further data set that is representative of the structure.

9. The medical imaging apparatus according to claim 1, wherein the acquiring of the location information comprises at least one of:
- applying a distance field to an external geometry,
- performing a landmark clustering process, and
- tracking an iso-surface across multiple phases.

10. The medical imaging apparatus according to claim 1, wherein the location information acquired by the processing circuitry comprises at least one of a numerical function, an analytical function, and a geometry function.

11. The medical imaging apparatus according to claim 1, wherein the structure comprises at least one of an anatomical structure, an organ, a tumor, and a region of tissue, and the hull is representative of a surface of the structure, an external structure, a navigation aid, an implant, or an acquisition device.

12. The medical imaging apparatus according to claim 1, wherein the ray casting algorithm performed by the processing circuitry further comprises, for at least some of the plurality of rays, estimating a position of a second intersection point at which the ray intersects the hull for a second time, and using the precomputed function to determine the contribution of the second intersection point to the aggregated color for the ray.

13. The medical imaging apparatus according to claim 1, wherein the ray casting algorithm performed by the processing circuitry further comprises, for at least some rays of the plurality of rays, estimating a position of a further intersection point at which the ray intersects a further, different hull that is part of a further structure represented in the volumetric data set, and using the precomputed function or a further precomputed function to determine the contribution of the further intersection point to the aggregated color for the ray.

14. The medical imaging apparatus according to claim 13, wherein the ray casting algorithm performed by the processing circuitry further comprises determining an ordering of the intersection point and the further intersection point relative to a direction of the ray.

15. The medical imaging apparatus according to claim 1, wherein a value for the precomputed function at the intersection point is dependent on whether the ray intersects the hull so as to pass from a first side of the hull to a second side of the hull, or the ray intersects the hull so as to pass from the second side of the hull to the first side of the hull.

16. The medical imaging apparatus according to claim 1, wherein the ray casting algorithm performed by the processing circuitry is a global illumination algorithm, and the ray is a photon ray performing photon mapping.

17. The medical imaging apparatus according to claim 1, wherein the volumetric data set comprises at least one of CT data, MR data, PET data, cone-beam CT data, X-ray data, and ultrasound data.

18. A method, comprising:
- acquiring a volumetric data set;
- acquiring location information including a geometry function describing a hull that forms a surface boundary of a structure represented in the volumetric data set; and
- performing a ray casting algorithm to generate a rendered image from the volumetric data set, wherein the ray casting algorithm comprises, for each of a plurality of rays cast through a volume of the volume of the volumetric data set:
  - determining data values for a plurality of sample positions along the ray;
  - estimating, based on the location information, a position of an intersection point at which the ray intersects the hull; and
  - using a precomputed function to determine a contribution of the intersection point to an aggregated color for the ray.

* * * * *